United States Patent [19]
Nourrcier, Jr.

[11] Patent Number: 5,638,163
[45] Date of Patent: Jun. 10, 1997

[54] LOW COST LASER RANGE FINDER SYSTEM ARCHITECTURE

[75] Inventor: Charles E. Nourrcier, Jr., Lakewood, Calif.

[73] Assignee: Hughes Electronics, Los Angeles, Calif.

[21] Appl. No.: 476,922

[22] Filed: Jun. 7, 1995

[51] Int. Cl.[6] .............................. G01C 3/08; G01C 25/00
[52] U.S. Cl. ........................ 356/5.01; 356/5.05; 356/6
[58] Field of Search ......................... 356/5.01, 5.05, 356/6

[56] References Cited

U.S. PATENT DOCUMENTS

| | | | |
|---|---|---|---|
| 4,527,894 | 7/1985 | Goede et al. | 356/28 |
| 5,013,151 | 5/1991 | Hughes | 156/152 |
| 5,089,727 | 2/1992 | Molitor et al. | 307/570 |
| 5,220,164 | 6/1993 | Lieber et al. | 250/214 VT |
| 5,365,055 | 11/1994 | Decker et al. | 250/214 R |
| 5,388,048 | 2/1995 | Yavnayi et al. | 364/461 |

*Primary Examiner*—Mark Hellner
*Attorney, Agent, or Firm*—Gordon R. Lindeen, III; Wanda K. Denson-Low

[57] ABSTRACT

A laser range finder including a receiver for detecting a return pulse and providing an output signal indicative thereof, a single integrated circuit digital range counter chip connected to receive the output signal from the receiver, a power supply unit for powering the receiver and range counter chip, and a single-chip microcontroller for selectively sequencing application of power to the receiver and to the range counter chip, for controlling laser firing, and for automatically recalibrating the receiver.

23 Claims, 9 Drawing Sheets

5,638,163

LOW COST LASER RANGE FINDER SYSTEM ARCHITECTURE

BACKGROUND OF THE INVENTION

1. Field of the Invention

The subject invention relates generally to laser apparatus and, more particularly, to a low-cost laser range finder system architecture which can be easily reconfigured to adapt to a variety of pulsed laser systems including designators, range finders, high PRF imaging laser radar, and micro range finders operating off limited battery power.

2. Description of Related Art

In the past, laser range finder receivers have been individually designed for each particular application. Thus, a different receiver design has been employed for a range finder using a flash lamp pumped laser, for a diode pumped laser, or for imaging laser radar. Power supplies for such systems typically have employed multiple DC/DC converters and preregulators operating at all times. In conventional range finder systems, the entire apparatus is typically powered, even though some components may not need power 99.9% of the time.

Present laser range finder receivers are optimized at room temperature and, therefore, are significantly suboptimal at other operating temperatures. System sensitivity over temperature thus cannot be guaranteed. In general, present laser range finder receiver circuitry is extremely complex and costly, requiring, in one example, on the order of over 40 integrated circuits. Such circuitry suffers from unsatisfactory production yield, amplifier instability, and digital noise coupling into sensitive analog circuits.

OBJECTS AND SUMMARY OF THE INVENTION

It is therefore an object of the invention to improve laser apparatus;

It is another object of the invention to provide a universal control architecture for various laser apparatus;

It is another object of the invention to improve laser range finder apparatus;

It is another object of the invention to provide an improved architecture for controlling operation of laser range finder apparatus;

It is another object to increase sensitivity of laser range finder systems;

It is another object of the invention to provide laser range finder apparatus which is cheaper, requires less power, and delivers better performance than conventional systems; and It is another object to significantly improve sensitivity of laser range finder systems over extended temperature ranges such as −40° to +85° C. while considerably decreasing system complexity and cost.

The laser range finder apparatus according to the invention includes a receiver means for detecting a return pulse and providing an output signal indicative thereof; a digital circuit means connected to receive the output signal from the receiver means and including a range counter; a power supply means for powering the receiver means and the digital circuit means; and a microcontroller or other programmed processor for controlling the other range finder circuitry. In particular, the microcontroller sequences power to the receiver means and to the digital circuit means, controls laser firing, and recalibrates the receiver means. The laser range finder apparatus may further include input/output and display means for transferring and displaying parameters related to its operation under direction of the microcontroller.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a multiconfigurable, programmable, automatically calibrated system which is relatively inexpensive and easy to manufacture.

Overall System Architecture

Figure 1:
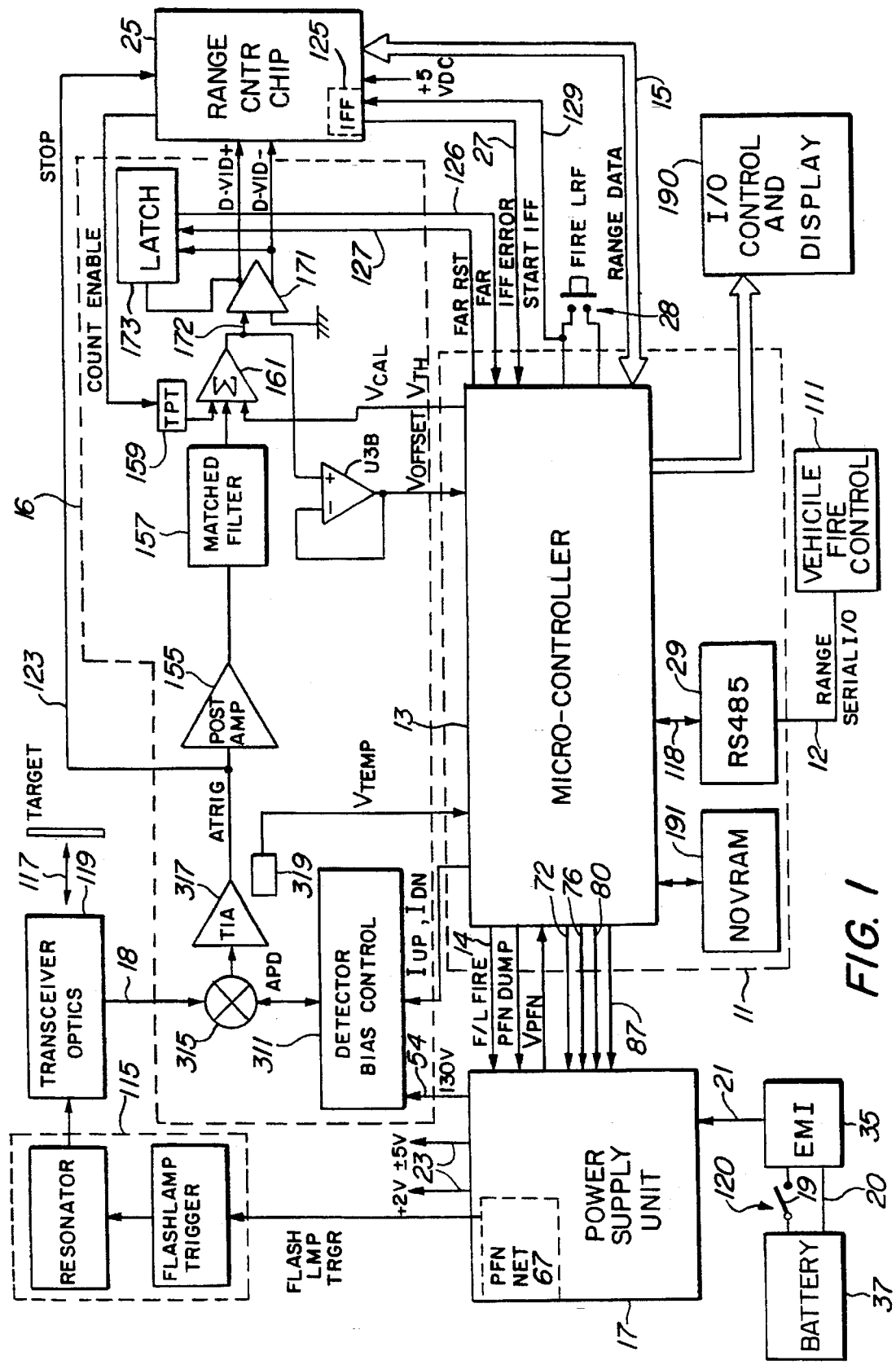
FIG. 1 is a block diagram illustrating a laser range finder and system architecture according to the preferred embodiment.

The preferred laser range finder system and its architecture are illustrated in FIG. 1. The system of FIG. 1 may be divided into a number of units: a power supply unit 17, a timing and control unit 11, a receiver 16, a range counter chip 25 including a range counter and associated digital circuitry, and a control panel/display unit 190. The remaining components shown in FIG. 1 include a laser module 115 for generating a laser beam, transceiver optics 119, a battery 37, and an EMI filter 35. These remaining components may comprise conventional apparatus, as known to those skilled in the art.

The timing and control unit 11 includes a microcontroller 13, a nonvolatile random access memory (NOVRAM) 191, and an RS485 system I/O or other interface 29. The RS 485 system I/O 29 is connected via an I/O bus 118 to the microcontroller 13 and via a bus 12 to an associated fire control system 111 for purposes of communicating between the microcontroller 13 and the associated fire control system 111.

The microcontroller 13 is a programmed processor and may be a commercially-available component such as Part No. 87C552, as available from Philips Semiconductors, Sunnyvale, Calif. This component has internal ROM storing its "boot-up" software. Various other custom or off-the-shelf processors, microprocessors, computers, or other programmed processor-based controllers could be used in embodiments according to the invention.

The NOVRAM 191 is arranged to be accessed by the microcontroller 13 and contains executable system code that is table driven. Various operating parameters are located in a table within the NOVRAM 191 (not part of compiled code), and can be modified in real time. Parameters which may be stored in the NOVRAM table include:

1. Receiver offset voltage
2. Threshold voltage
3. False alarm rate
4. APD bias voltage
5. PFN voltage
6. Display brightness
7. Programmable range gate
8. Super elevation table for weapon calibration The use and significance of the above parameters will be elaborated upon hereafter.

The NOVRAM 191 is preferably partitioned into two parts, one containing the tables, and the other containing executable software, e.g., compiled "C" code which looks into the tables for parameters it needs to operate the hardware. The tables themselves can also be updated. Thus, if desired, the software can be updated in the field by a plug-in connection to a portable computer without opening up the hardware.

The microcontroller 13 communicates over a bus 15 with the range counter chip 25. The range counter chip 25 includes a digital range counter which counts the interval between firing of a laser pulse and detection of a return of that pulse, the count representing the distance or range to the target. A principle function of the bus 15 is therefore to transfer range data (counts) to the microcontroller 13, and thus the bus 15 comprises a standard bus architecture providing read, write, address, and data lines. The range counter chip 25 may include a high-speed digital counter and high-speed data register, as disclosed in U.S. patent applications Ser. Nos. 08/449,461, filed May 24, 1995 and 08/484,736, filed Jun. 7, 1995, respectively entitled "High-Speed Synchronous Counter Circuitry" and "High-speed Data Register for Laser Range Finders." The range counter chip may further include an IFF counter 125, delay line differentiator logic (FIG. 5), programmable range gate (FIG. 7), and digital status registers, as discussed hereafter.

The microcontroller 13 is further arranged to provide a flash lamp fire signal "F/L Fire" over a signal line 14 to cause firing of a laser or "optical" pulse by the range finder laser module 115. The microcontroller 13 may be activated to generate the F/L Fire signal by a laser fire command signal FIRE LRF generated in response to manual or other activation of a laser range finder fire command switch 28. The laser fire command signal FIRE LRF is also supplied via a signal line 129 to the IFF counter 125 and causes the counter 125 to begin counting.

A portion 18 of the optical pulse 117 generated by the laser module 115 is detected by a photodetector 315 in the receiver 16 and provides a "stop" signal over a stop signal line 123 to the IFF counter 125, which is a 16-bit counter in a preferred embodiment. The IFF counter 125, in turn, stops counting and its IFF time interval count is provided over a signal line 27 to the microcontroller 13. This count may then be used for Identification Friend or Foe purposes as described in U.S. patent application Ser. No. 08/364,321, filed Dec. 27, 1994, entitled "Laser Range Finder IFF", incorporated by reference herein.

Some laser range finder systems have two optical receivers, one for detecting target returns, and the other comprising an optical pulse monitor ("OPM") for detecting the presence of an outgoing pulse and generating a stop pulse such as that provided over the stop signal line 123. Such a system typically uses a beam splitter to direct a small portion of the transmitted beam onto the OPM. Other systems use a single receiver, in which case there is no OPM or beam splitter, and the presence of an outgoing pulse is detected in the same manner as a target return. In such case, back-scatter off the optics reflects back into the system and illuminates the receiver, which causes a stop pulse to be generated.

The power supply unit 17 may be powered by the battery 37 and intervening EMI filter 35. The battery 37 is connected via first and second terminals 19, 20 and an LRF ON/OFF switch 120 to the EMI filter 35, which outputs a filtered voltage over signal path 21 to the power supply unit 17. The LRF ON/OFF switch 120 turns power to the laser range finder (LRF) on and off. The power supply 17 provides a plurality of constant low-voltage power outputs 23, to be described in further detail below.

The microcontroller 13 further is arranged to monitor the receiver 16 and to recalibrate it. For these purposes, the microcontroller receives inputs from the receiver 16 comprising a temperature voltage $V_{TEMP}$, an offset voltage $V_{OFFSET}$, and a false alarm rate (FAR) signal on a signal line 126, and outputs control signals to the receiver 16 comprising first and second detector bias control signals $I_{UP}$, $I_{DN}$; a calibration voltage $V_{CAL}$; and an FAR reset signal on a signal line 127. The interaction between the microcontroller 13 and the receiver 16 will be discussed in further detail below.

Power Management Circuitry

Figure 2:
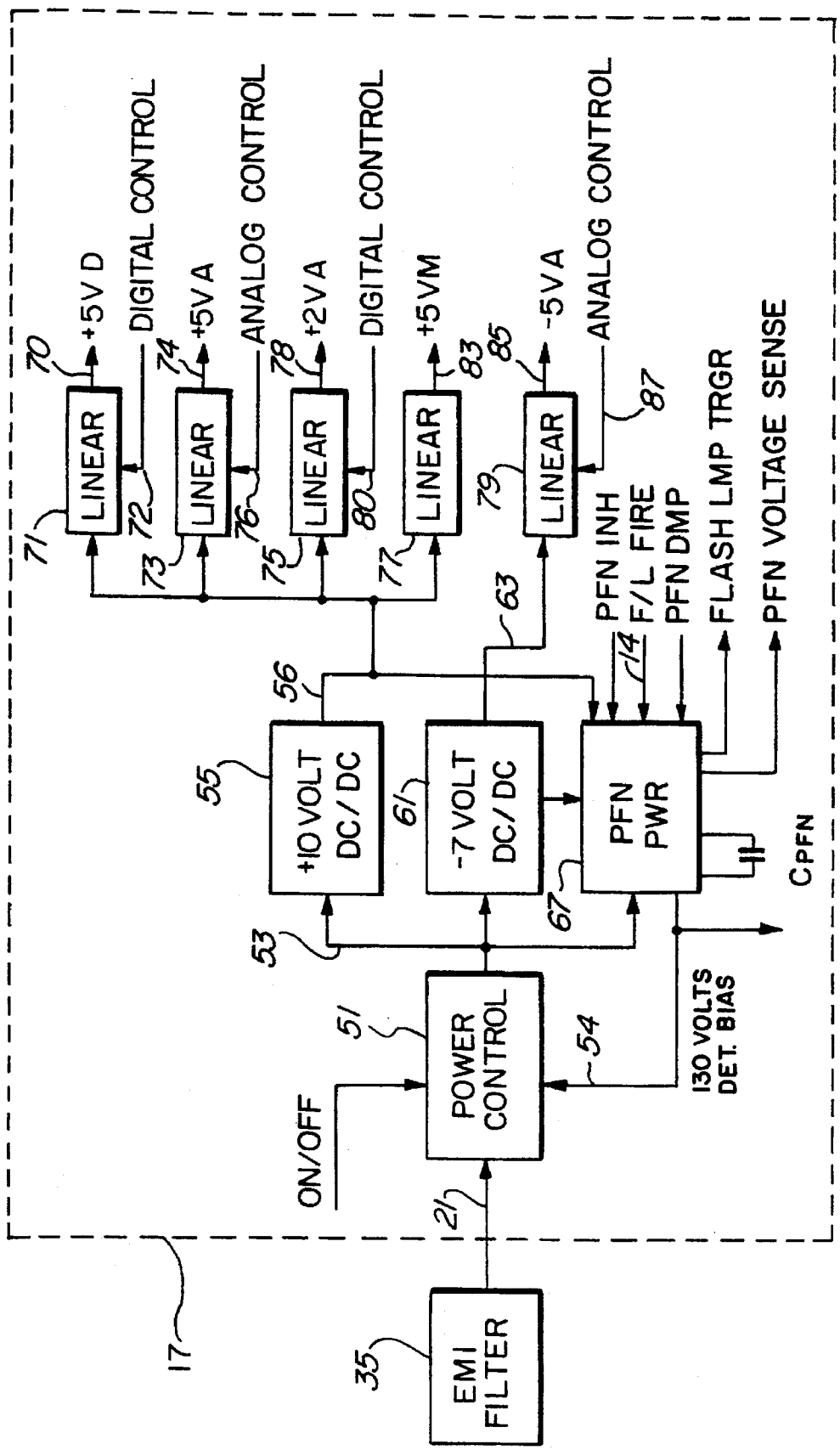
FIG. 2 is an electrical circuit block diagram of power supply circuitry according to the preferred embodiment.
Figure 3:
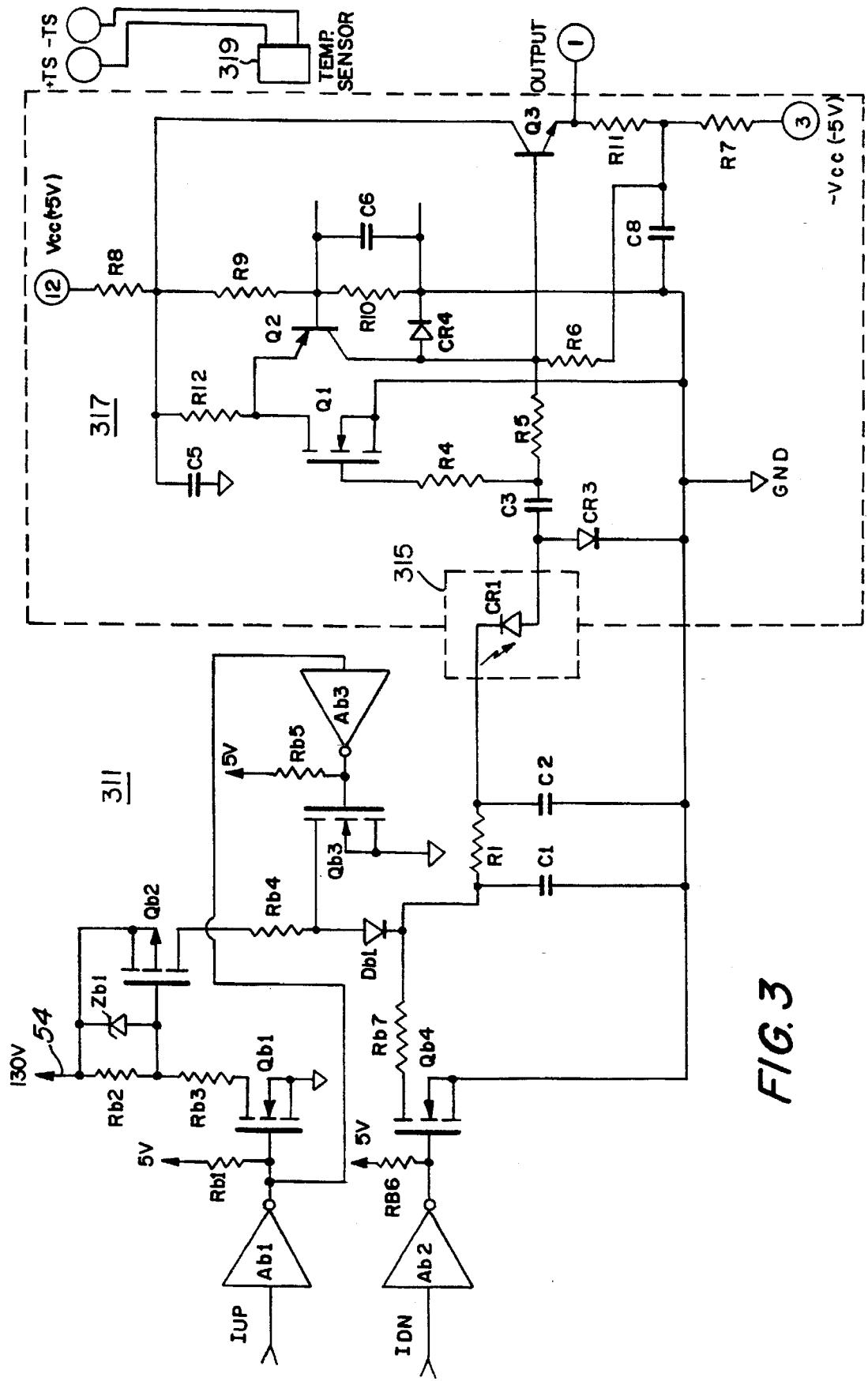
FIG. 3 is an electrical circuit diagram of photodetector bias circuitry and transimpedance amplifier (TIA) circuitry according to the preferred embodiment.

As shown in more detail in FIG. 2, the power supply unit 17 includes a PFN power unit 67, which powers a pulse forming network (PFN) including a PFN capacitor $C_{PFN}$. The capacitor $C_{PFN}$ is charged up to a voltage of, for example, 800 volts. This voltage is applied to the laser module 115 to generate optical energy and may vary from system to system, as may the value of $C_{PFN}$. The 800 volts is divided down within the power unit 67 using a zener diode to generate 130 volts, which is output on a signal line 54 to a power control unit 51 and to the detector bias control circuitry 311 (FIGS. 1, 3).

The PFN power unit 67 receives first, second, and third inputs from the microcontroller 13, namely a PFN INH (inhibit) signal, a PFN DMP (dump) signal, and the flash lamp fire signal F/L Fire. The PFN power unit 67 provides first and second outputs, namely a flash lamp trigger bias signal (FLASH LMP TRGR) and a PFN Voltage Sense signal. The microcontroller 13 senses or samples the level of the voltage on the PFN capacitor $C_{PFN}$ via the Voltage Sense signal. The microcontroller 13 can discharge the PFN capacitor $C_{PFN}$ via the PFN DMP signal, for example, for reset purposes when the system is turned off. The flash lamp trigger bias signal is generated in response to the F/L Fire signal to cause initial ionization in the laser to cause its firing, as known in the art.

The linear regulators 71, 73, 75, 77, 79 shown in FIG. 2 are used to power the various analog and digital circuitry of the laser range finder, as well as the microcontroller 13. The first linear regulator 71 supplies a +5-volt output on a signal line 70 for powering the range counter chip 25 and receives an input of a control signal from the microcontroller 13 on a signal line 72. The second linear regulator 73 supplies a +5-volt output on a signal line 74 for powering the receiver 16 and receives a control signal from the microcontroller 13 on a signal line 76. The third linear regulator 75 supplies a +2-volt voltage on a signal line 78 for powering the range counter chip 25 and receives a control signal on a signal line 80 from the microcontroller 13. The fifth linear regulator 79 supplies a negative 5-volt output on a signal line 85 for use by the receiver 16 and receives a control signal from the microcontroller 13 on a signal line 87. The microcontroller 13 thus is enabled to selectively switch power on and off to the receiver 16 and range counter chip 25 by applying appropriate on/off control signals on the respective signal lines 72, 76, 80, and 87.

The fourth linear regulator 77 supplies a +5-volt output on a signal line 83, which is used to power the microcontroller 13. Under full load, the microcontroller 13 uses less than 15 mA. Most of the time the microcontroller 13 is inactive or "asleep" and needs less than 5 mA.

According to the preferred embodiment, conventional linear regulators 71, 73, 75, 77, 79 with integrated on/off control are used. The efficiency of the linear regulators 71, 73, 75, 77, 79 is not an issue because the system duty cycle is typically less than 1%. Therefore, low cost and small size become more important than efficiency. The front end power control circuit 51 of FIG. 2 is preferably a solid state circuit providing reverse and overvoltage protection for the subsequent circuitry, for example, as disclosed in U.S. patent application Ser. No. 08/364,322, filed Dec. 27, 1994, entitled "Laser Range Finder Power Management System," incorporated by reference herein.

Receiver Circuitry and Range Gate

Another major component necessary to produce a high performance pulsed laser range finder is a high sensitivity optical receiver to convert a photon signal to an analog signal, to finally detect the presence of a target return, and to output a signal corresponding to the target return.

The receiver 16 of FIG. 1 includes a photodetector 315, which converts the received optical pulse portion 18 to an electrical signal, and a transimpedance amplifier 317 for amplifying the electrical signal generated by the photodetector 315. The detector bias control circuitry 311 receives 130-volt PFN power from the power supply unit 17 and controls the bias voltage applied to the detector 315 in order to optimize performance, as discussed further below. The detection element employed in the photodetector 315 is preferably an avalanche photodiode ("APD"). A temperature sensor 319 is mounted on the same substrate as the photodetector 315 to monitor its temperature. The temperature sensor 319 supplies a voltage $V_{TEMP}$ indicative of the photodetector temperature to the microcontroller 13.

The output of the transimpedance amplifier ("TIA") 317 provides a first input to a postamplifier 155, which typically applies a gain factor of "5" to its input. The output of the postamplifier 155 is supplied to a matched filter 157. The matched filter 157 is a low pass filter, preferably a third order Butterworth filter, whose bandwidth is determined to optimize the signal-to-noise ratio (SNR) based on the output laser pulse width and the noise characteristics of the photodetector 315 and the TIA amplifier 317. As known in the art, a matched filter is a filter designed to be optimal for the waveform and desired performance. In this case, the matched filter 157 is designed to optimize range accuracy for a simple threshold detection system and to minimize noise (maximize sensitivity).

The output of the matched filter 157 comprises one input to a buffer and summing amplifier 161, which sums the matched filter output with a DC voltage $V_{CAL}$ for false alarm rate and offset calibration and with a time programmed threshold signal ("TPT") generated by TPT circuitry 159. The TPT circuitry 159 receives as an input a count enable signal from the range counter chip 25.

The TPT signal provides a time program threshold to block the effects of "near-end" atmospheric back-scatter. When the laser is fired, as it is exiting the aperture, dust particles can cause near-end returns until the laser energy dissipates sufficiently by traveling over distance. Thus, the "TPT" signal elevates the threshold voltage supplied to the threshold comparator 171 and allows that voltage to decay and settle to the maximum sensitivity threshold voltage, for example, at the point where the laser has traveled one kilometer, thereby blocking the effects of near-end atmospheric back-scatter.

The output of the buffer and summing amplifier 161 drives the threshold detection circuitry and is applied as an input to a threshold comparator amplifier 171. Since one input of the threshold comparator 171 is tied to ground, threshold setting is achieved by generating an offset voltage on the signal path 172, in response to the application of the calibration voltage $V_{CAL}$ to the input of the summing amplifier 161. Thus, for example, if the steady state DC voltage on the signal path 172 is driven away from zero by a constant DC voltage of 15 millivolts, the system threshold is effectively set at 15 millivolts. The threshold amplifier 171 provides a differential output signal across two amplifier output lines D-VID+ and D-VID− to the range counter chip 25 (hereafter denoted simply as "D-VID"). In response to this differential output signal D-VID, the count of the range counter (e.g., 183, FIG. 5) at the instant of appearance of such an output signal is read and latched by digital register circuitry included on the range counter chip 25. The signal D-VID thus signifies the detection of a return pulse.

Figure 7:
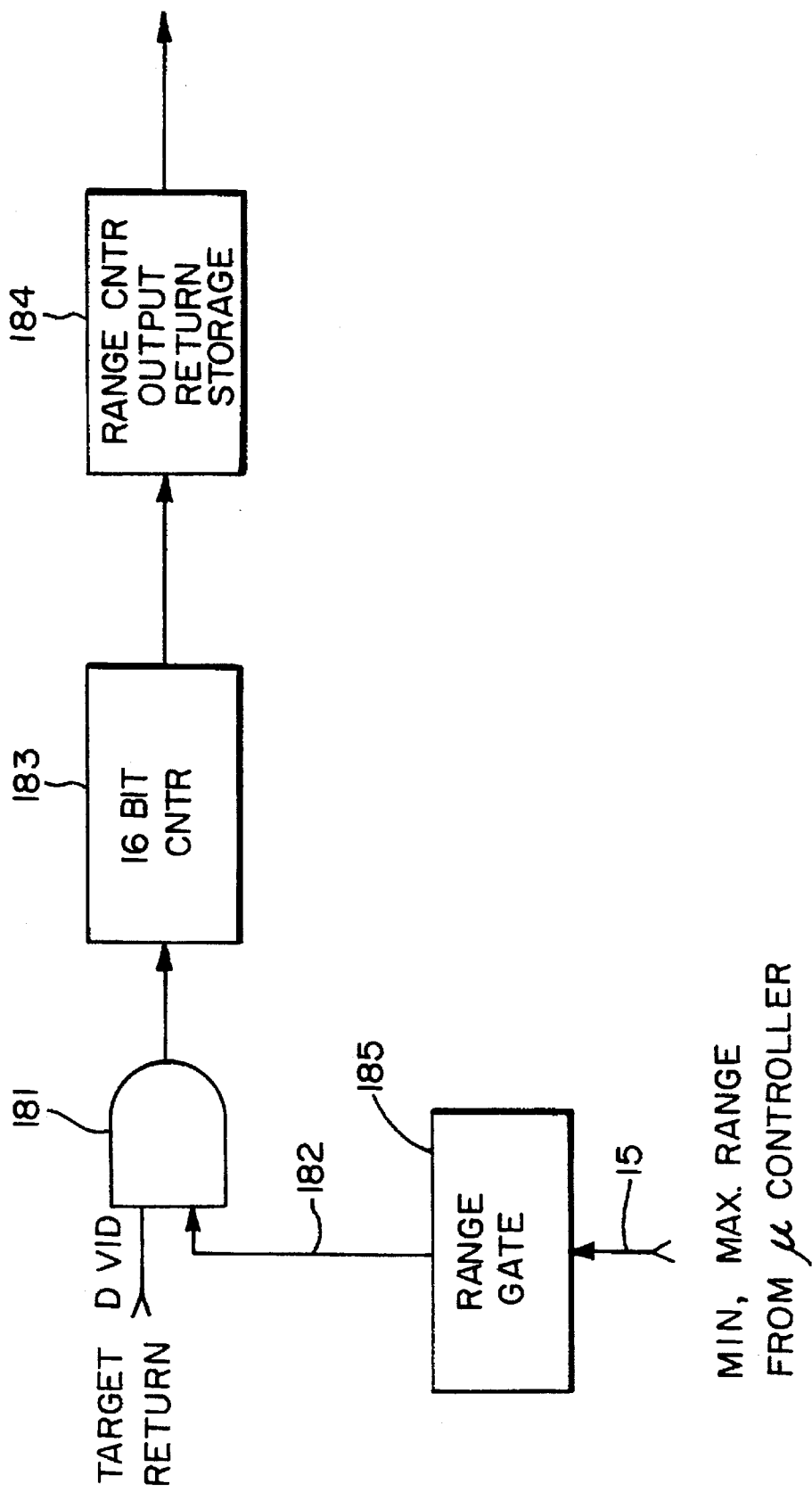
FIG. 7 is a circuit block diagram illustrating programmable range gate circuitry according to the preferred embodiment.

As shown in FIG. 7, a programmable range gate circuit including an AND gate 181 is provided on the range counter chip 25 and receives the D-VID signal as one input and a control signal line 182 as a second input. A control signal is provided on the line 182 at a programmed time after the laser is fired. In this manner, any false activation or triggering of the range counter 183 prior to such time is positively prevented by the programmable range gate circuit. Similarly, after maximum range occurs, the control signal is removed from the control signal line 182, and the AND gate 181 thereafter precludes return pulses from generating target ranges. The microcontroller 13 loads the minimum and maximum ranges (the "range gate") into registers of a range gate circuit 185 via the 8-bit bus 15 (FIG. 1). The range gate circuit 185 employs digital logic and the minimum and maximum range counts to generate the range gate signal line 182.

Figure 5:
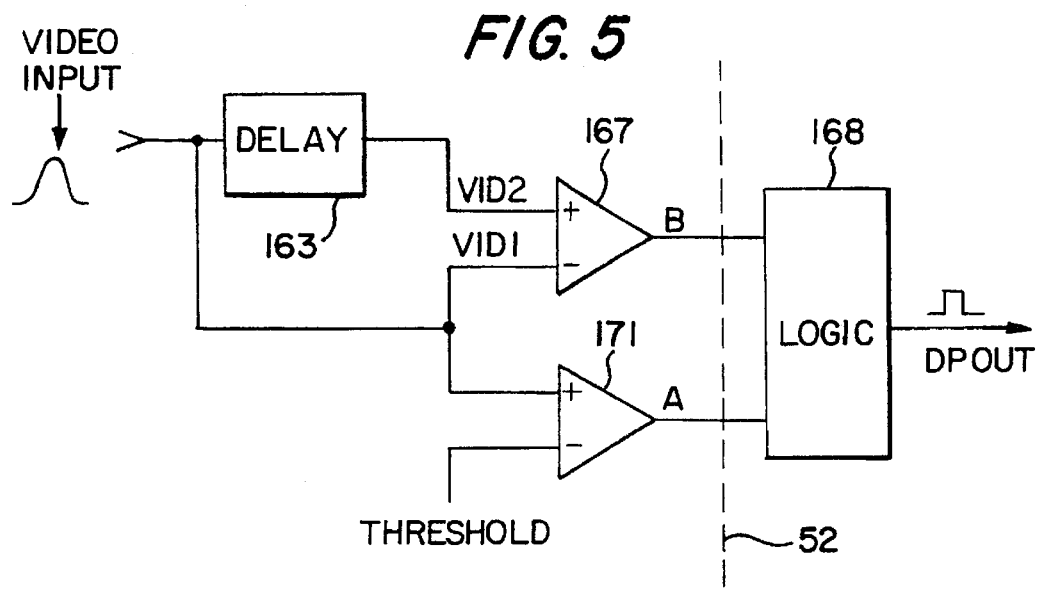
FIG. 5 is a circuit diagram of optional delay line differentiator circuitry.

The output of the buffer amplifier 161 may also be supplied as a first input video pulse VID1 to a delay line differentiator (DLD) circuit shown in FIG. 5. The second input video pulse VID2 to the DLD circuit is a delayed version of the output of the summing amplifier 161 supplied by a delay circuit 163. The delay circuit 163 applies a delay "τ," which may be equal to the pulse width of the laser output of the range finder. The value of τ can vary, depending on the required system performance.

Figure 6:
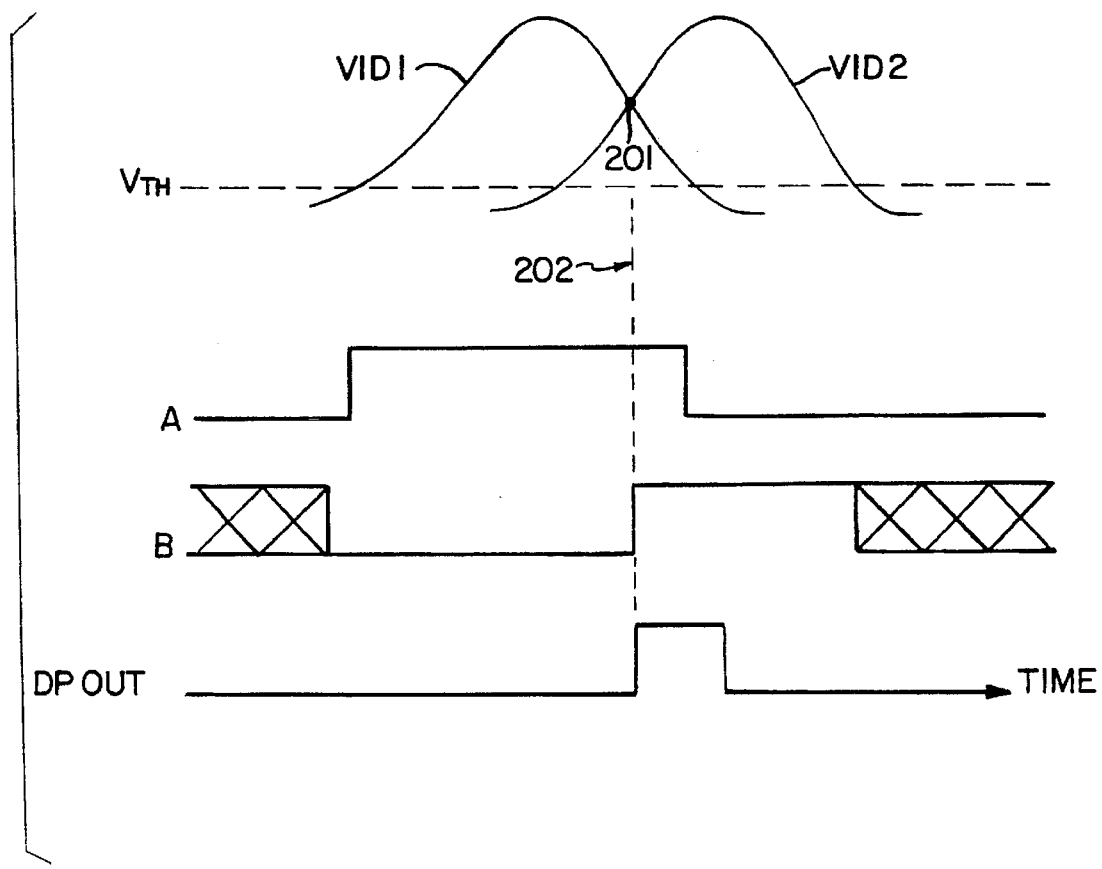
FIG. 6 is a waveform diagram illustrating operation of the circuitry of FIG. 5.

The operation of the DLD circuit of FIG. 5 may be appreciated from the waveform diagrams of FIG. 6. The generally Gaussian-shaped video pulses VID1 and VID2 intersect in time at point 201, at which point the output B of the DLD comparator 167 switches state or goes "high." Prior to that time, the output B of the DLD comparator 167 exhibits considerable noise, illustrated by the cross-hatched regions in FIG. 8, until the arrival of the video pulse VID1. The output A of the threshold comparator 171 switches state, i.e., goes high, when the video pulse VID1 exceeds the threshold level $V_{TH}$. The logic circuit 168 functions to produce an output pulse DPOUT at the point in time indicated by the dashed line where both outputs A and B are high; in other words, when the threshold comparator 171 has detected that the threshold has been exceeded and the waveforms of the video pulses VID1 and VID2 coincide. At this point, the receipt of a target return is declared.

The DLD circuit of FIG. 5 provides an improvement over the use of a threshold comparator alone because the time of arrival detected by the threshold comparator alone varies with the strength, i.e., width of the received pulse, while the output of the DLD comparator 167 is independent of signal strength. The logic block 168 may be built into the range counter chip 25 so that a delay line differentiator can be used in systems requiring better range accuracy. This technique can predict very precise time of arrival of the target return pulse (better than one-tenth the half power pulse width) and is independent of signal amplitude.

APD Bias and TIA

As shown in FIG. 3, the preferred embodiment includes an APD bias circuit 311, an APD detector 315, and a transimpedance amplifier circuit 317. While the detector 315 is preferably an APD device, other detector devices, such as PINs, can be used in various embodiments according to the invention.

With respect to the APD bias circuit 311, $I_{UP}$ and $I_{DN}$ signals are applied to the inputs of respective inverter amplifiers $A_{b1}$, $A_{b2}$ by the system microcontroller 13. The output of the inverter $A_{b1}$ is applied to the gate of a first bias circuit field effect transistor (FET) $Q_{b1}$ and to the input of a second inverter amplifier $A_{b3}$. The gate of the first bias circuit FET $Q_{b1}$ is connected through a resistor $R_{b1}$ to a reference voltage (+5 volts). The source of the first FET $Q_{b1}$ is connected to ground, while its drain is connected to a first terminal of a resistor $R_{b3}$. The second terminal of the resistor $R_{b3}$ is connected to a first terminal of a resistor $R_{b2}$ and to the gate of a second bias circuit FET $Q_{b2}$. The second terminal of the resistor $R_{b2}$ and the source of the second bias circuit FET $Q_{b2}$ are connected in common to the 130-volt dc supply voltage. A zener diode $Z_{b1}$ is connected in parallel with the resistor $R_{b2}$.

The drain of the second bias circuit FET $Q_{b2}$ is connected to a first terminal of a resistor $R_{b4}$ whose second terminal is connected to the anode of a diode $D_{b1}$ and to the drain of a third bias circuit FET $Q_{b3}$. The source of the third bias circuit FET $Q_{b3}$ is connected to ground, while its gate is connected to one terminal of a resistor $R_{b5}$ and to the output of the inverter amplifier $A_{b3}$. The second terminal of the resistor $R_{b5}$ is connected to a 5-volt dc reference voltage.

The cathode of the diode $D_{b1}$ is connected to a first terminal of a bias voltage storage capacitor C1 and to the drain of a fourth bias circuit FET $Q_{b4}$, whose source is grounded. The gate of the fourth bias circuit FET $Q_{b4}$ is connected to the output of the inverter amplifier $A_{b2}$ and to one terminal of a resistor $R_{b6}$ whose second terminal is connected to the 5-volt dc reference voltage.

The bias voltage storage capacitor C1 has its first terminal further connected to one terminal of a resistor R1 whose second terminal is connected to a shunt capacitor C2 and to the cathode of the APD detector diode CR1. The second terminal of the shunt capacitor C2 is grounded. The anode of the APD diode CR1 is connected to the anode of a PN diode CR3 whose cathode is further connected to ground. An AC coupling capacitor C3 connects the anode of the APD detector diode CR1 to the input of the transimpedance amplifier 317.

The input to the transimpedance amplifier 317 comprises a node constituting the intersection of the first terminals of respective resistors R4 and R5. The second terminal of the resistor R4 is connected to the gate of a first FET Q1, whose source is connected to ground and whose drain is connected to the first terminal of a resistor R12 and the emitter of an NPN transistor Q2. The second terminal of the resistor R12 is connected to one terminal of a capacitor C5 whose opposite terminal is grounded, as well as to the collector of a PNP transistor Q3.

The collector of the second transistor Q2 is connected to the anode of a PN diode CR4 and to the junction point of the second terminal of the resistor R5 and the first terminal of a resistor R6. The cathode of the PN diode CR4 is connected to one terminal of a capacitor C6 whose second terminal is connected to the base of the transistor Q2. The base of the transistor Q2 is further connected via a resistor R9 to the second terminal of the resistor R12 and to a resistor R8 whose second terminal is connected to the 5-volt dc reference voltage.

The base of the third transistor Q3 is connected to the second terminal of the resistor R5, which thus constitutes a feedback resistor from the output to the input of the amplifier 317. The emitter of the third transistor Q3 constitutes the output of the transimpedance amplifier circuit 317 and is further connected to the first terminal of a resistor R11. The second terminal of the resistor R11 is connected to the first terminal of a resistor R7, whose second terminal is connected to a −5-volt dc reference voltage. The first terminal of the resistor R7 is further connected to a first terminal of a capacitor C8 and to the second terminal of the resistor R6. The second terminal of the capacitor C8 is grounded. Examples of typical components for the circuitry of FIG. 3 are as follows:

TABLE

| Resistances K(Ω) | Other Components |
| --- | --- |
| $R_{b1}$ - 2 | C1 - 22 nF |
| $R_{b2}$ - 4.7 | C2 - 10 pF |
| $R_{b3}$ - 100 | C3 - 15 pF |
| $R_{b4}$ - 200 | C5 - .01 μF |
| $R_{b5}$ - 2 | C6 - 10 nF |
| $R_{b6}$ - 2 | C8 - .01 μF |
| $R_{b7}$ - 200 | CR3 - HP 5082 |
| R1 - 3.3 | CR4 - HP 5082 |
| R4 - .02 | Q1 - NEC71000MVC |
| R5 - 51 | Q2 - 2N4957 |
| R6 - 1 | Q3 - 2N2857 |
| R7 - .01 | |
| R8 - .01 | |
| R9 - 1.27 | |
| R10 - 1 | |
| R11 - 2.3 | |
| R12 - .160 | |

The foregoing values are illustrative only and may be varied in various embodiments for optimal performance in various laser range finder systems.

In operation of the circuit of FIG. 3, $I_{UP}$ and $I_{DN}$ control signals are selectively applied by the microcontroller 13. The control signal $I_{UP}$ turns on the FET $Q_{b2}$ by turning off the FET $Q_{b1}$, causing the gate of the FET $Q_{b2}$ to float up in voltage. The increase in voltage permits current to flow from the 130-volt source through the resistor $R_{b4}$ and the diode $D_{b1}$, causing the voltage on the bias voltage storage capacitor C1 to increase until such time as the $I_{UP}$ control signal is turned off. The open collector type of logic gate is particularly designed to drive FETs such as FET $Q_{b1}$.

When the $I_{UP}$ control signal is off, the FET $Q_{b3}$ turns on, shorting the resistor $R_{b4}$ to ground so as to drain off leakage current from FET $Q_{b2}$ in order to prevent such current from further charging the capacitor C1. While $I_{UP}$ is off, the diode $D_{b1}$ serves to maintain the bias voltage held by the capacitor C1; i.e., it prevents discharge of the capacitor voltage by current flow through the FET $Q_{b3}$. The bias voltage held by the capacitor C1 may range from 30 volts to 90 volts and is determined by the length of time $I_{UP}$ is "on" and the breakdown voltage of the APD 315.

Application of the $I_{DN}$ control signal turns on the FET $Q_{b4}$ and discharges the bias voltage storage capacitor C1 to ground through the resistor $R_{b7}$. Both IUP and IDN are off when the circuitry is inactive.

Once the bias voltage storage capacitor C1 has been charged, the detector circuit 315 is biased for operation, for example, to detect a laser pulse return after firing of the laser. As previously noted, when the laser is initially fired, a large amount of energy is reflected or "back-scattered" back into the laser range finder optics, causing the TIA amplifier 317 to saturate. Accordingly, the diode CR3 is employed in the circuit to become forward biased by the increase in detector voltage and to dump the charge to ground; i.e., the diode CR3 comprises protection circuitry for accommodating initial overloads. The circuit provided by the capacitor C2 and the resistor R1 connected to the APD 315 limits the amount of energy which can be dumped through the diode CR3. After the diode CR3 stops conducting, the voltage on the capacitor C2 rapidly increases, via charging current flow through the capacitor C1 and the resistor R1.

The TIA 317 itself may be viewed as a typical operational amplifier having a feedback resistor R5 connected between its output and inverting input which, in an illustrative embodiment, has a value of 51 KΩ.

In the preferred TIA amplifier 317 shown in FIG. 1, the current flowing into the R4-R5-C3 node is multiplied by the value of the feedback resistor R5, producing an output voltage at the emitter of the third transistor Q3. The FET Q1 has a "gm" parameter associated with it, which is basically a voltage-to-current converting factor. As current flows through the coupling capacitor C3, the gate voltage on the FET Q1 rises, causing more current flow through the FET Q1. The transistor Q2 tries to hold the drain of the FET Q1 at a constant voltage. Thus, as the FET Q1 "asks" for more current, the transistor Q2 turns off. As the transistor Q2 shuts off, in order to hold steady state, its collector voltage moves down, producing a voltage across the feedback resistor R5. For the selected value of R5 of 51 KΩ, this voltage ultimately equals 51 KΩ times the current flowing through the AC coupling capacitor C3. The transistor Q3 is a buffer-follower whose emitter voltage side is 0.7 below the voltage on its base (i.e., the voltage developed across the feedback resistor R5).

The TIA amplifier resistor R6 can be used to achieve a manufacturing advantage according to the preferred embodiment. The stability of the amplifier is a function of the open loop gain, which is determined by the "gm" of the FET Q1 and the value of the resistor R6. Thus, if gm changes, the value of R6 may be adjusted to compensate for it. Thus, in production, an entire wafer of FETs Q1 may be fabricated. After R6 is adjusted to get proper compensation for one of the FETs Q1 from the wafer, all devices on that wafer can be used with the same R6 value.

As to the remainder of the components, the resistors R9 and R10 bias the transistor Q2 and set its operating point. The capacitor C6 makes the node an AC short circuit. The diode CR4 prevents circuit overload. The resistors R7 and R11 are respectively used for power supply isolation and to bias the second transistor Q3.

The feedback resistor R5 determines the amount of transimpedance gain, i.e., current-to-voltage transfer. Whatever current goes through C3×51K equals the output voltage swing. The feedback resistor R5 further determines the ultimate bandwidth of the system. Lowering the value of R5 provides more bandwidth, enabling the system to operate with shorter laser pulses.

The detector 315 and TIA amplifier 317 are preferably formed as a hybrid circuit on a common substrate such as alumina. A temperature sensor 319 is mounted on the substrate next to the detector 315 and enables optimizing the receiver 16 as a function of temperature. Thus, the microcontroller 13 may continuously monitor and recalibrate the receiver 16 as a function of temperature, as described in further detail below. The temperature sensor 319 may be a commercially-available AD590 sensor wherein a reference voltage is applied to a first terminal +TS, producing a current at a second terminal −TS which is related to temperature. This current is converted to a voltage which enables the associated microcontroller 13 to read the temperature of the detector 315.

The frequency response of the system of FIG. 3 is measured by illuminating the detector 315 with an unmodulated CW source and looking at the noise spectrum at the output TIA OUT of the amplifier 317. The noise spectrum will have a power envelope versus frequency that is characteristic of the detector/preamplifier frequency response. The frequency response of the amplifier 317 will vary from part to part due to the "gm" parameter of the preferred NEC71000 GaAs FET. The feedback loop can compensate for this effect by adjusting the values of the resistors R5 and R6. This is an important cost savings because the select-in-test only occurs once for each lot-buy of the NEC71000 FET. Therefore, the value of the resistor R6 is selected on the first unit and is fixed for the balance of the production run. The value of the resistor R5 is not normally changed because it affects the amount of output voltage.

Another feature is the addition of the temperature sensor 319 within the detector/preamplifier package. The optimum detector bias voltage can shift dramatically with temperature changes. The temperature sensor 319 allows the system to monitor this condition and self-calibrate the receiver operating parameters, such as receiver offset voltages, false alarm rate, and APD bias voltage, as discussed in further detail below. Essentially, the receiver 16 can be optimized for performance over the entire operating temperature range.

As those skilled in the art will appreciate, the APD photodetector 315 is backed biased so that it only conducts when light hits it, i.e., excess photons convert to electrons, resulting in current flow to the TIA 317. The receiver sensitivity is optimized by increasing the APD bias voltage (this increases the APD gain) until the APD noise is larger than the electronics noise. Once the APD noise begins to dominate the electronics noise of the preamplifier 317, further increases in APD gain will reduce the system NEP (noise equivalent power). At low temperatures, the APD gain must be high in order to overcome the preamplifier noise. This is due to low leakage currents within the APD at low temperatures. Under these conditions, the APD noise may not be larger than the preamplifier noise because of limitations in achievable APD gain. All of these effects can be optimized by monitoring the APD temperature along with self-calibrating electronics as disclosed herein.

Post-TIA Receiver Structure

Figure 4:
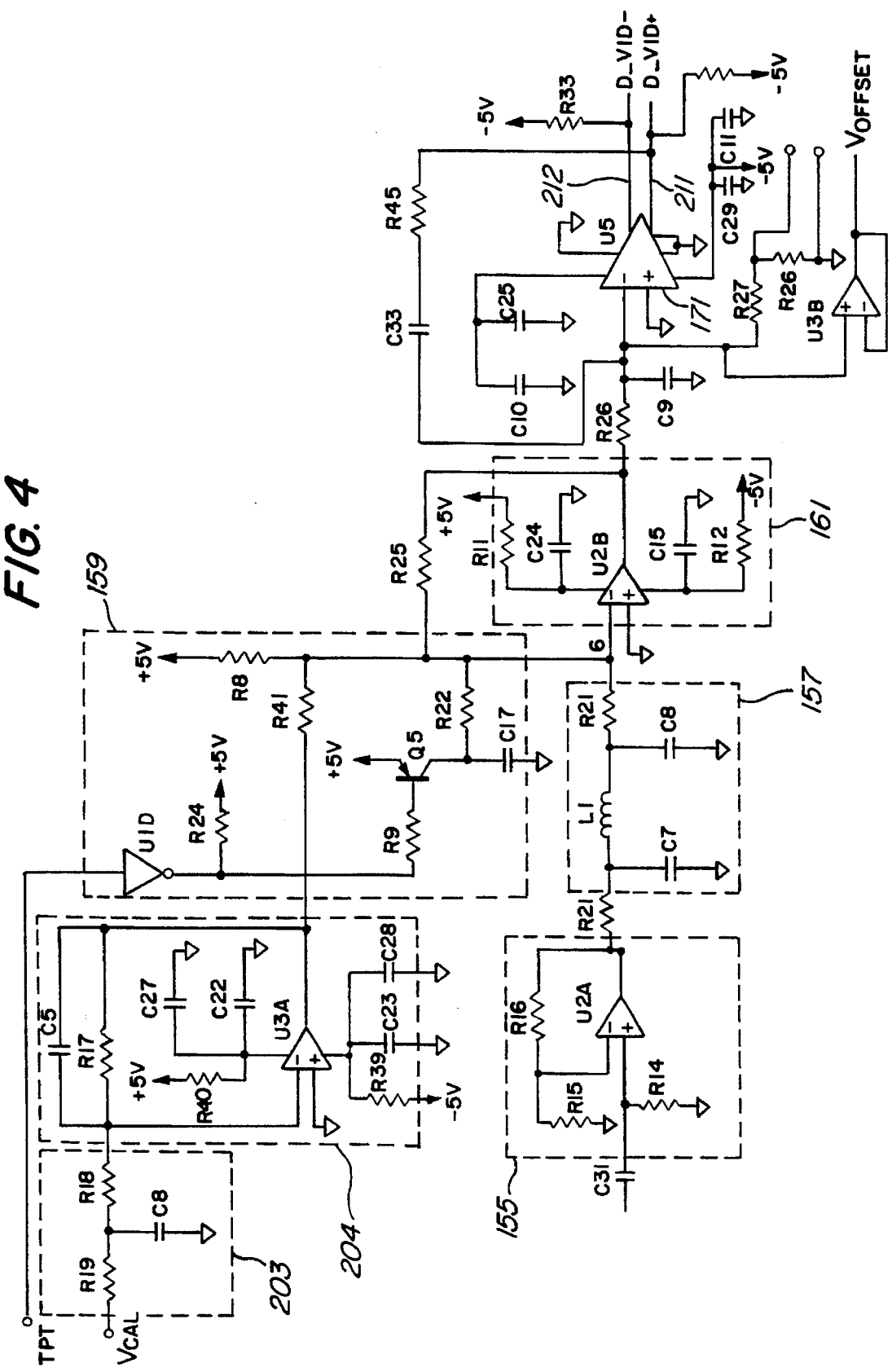
FIG. 4 is an electrical circuit diagram of post-TIA amplifier receiver circuitry according to the preferred embodiment.

The post-TIA receiver circuitry of the receiver 16 is shown in more detail in FIG. 4. The signal output from the TIA amplifier 317 is provided through a blocking capacitor C31 to the postamplifier 155, which includes a CLC 412 operational amplifier U2A. The amplifier U2A is biased via resistors R14, R15, and R16. The feedback resistor R16 is connected from the output of the amplifier U2A to its inverting input, while the resistors R15 and R14 are respectively connected from ground to the inverting and non-inverting inputs of the amplifier U2A. The output of the amplifier U2A is supplied through a resistor R20 to the matched filter 157.

The matched filter 157 includes an inductor L1 having first and second terminals and respective capacitors C7, C8 connected, respectively, from those first and second terminals to ground. The output of the filter 157 is supplied through a resistor R21 to a summing node 6, which comprises the inverting input of an operational amplifier U2B. This summing node 6 also receives a TPT signal and a form of the $V_{CAL}$ signal, as will be hereafter described. The amplifier U2B sums these two signals TPT, $V_{CAL}$ with the detected, filtered signal from the matched filter 157.

As shown in the left portion of FIG. 4, the calibration signal $V_{CAL}$ supplied by the microcontroller 13 has been digital-to-analog converted and is supplied to a low-pass filter 203 and thereafter to an operational amplifier circuit 204, including an operational amplifier U3A. The low-pass filter 203 comprises first and second resistors R18 and R19 having junction points connected to the first terminal of a capacitor C6 whose second terminal is grounded.

The amplifier U3A is biased by respective bias circuits, each comprising first and second grounded capacitor pairs C22, C27; C23, C28 connected to the junction point of the respective first terminals of resistors R39, R40, whose second terminals are connected to respective supply voltages −5 volts and +5 volts. The amplifier circuit 204 including amplifier U3A further includes a resistor R17 and a capacitor C5 connected in parallel between the output of the amplifier U3A and its inverting input. The parallel combination of the resistor R17 and the capacitor C5 provide further low-pass filtering for noise reduction purposes. The gain of the amplifier U3A is equal to R17/(R19 +R18), which is set equal to the value "1" in the illustrated embodiment. The amplifier circuit 204 including the amplifier U3A thus buffers the $V_{CAL}$ signal, filters it, and establishes the desired gain range of its output signal, which is then fed through a resistor R41 to the summing node 6. A resistor R8 connected between the +5 supply voltage and the summing node 6 is further provided to ensure that the $V_{CAL}$ signal supplied to node 6 resides within a desired or selected range, for example, −100 millivolts to +50 millivolts.

The TPT signal is a binary valued signal which is supplied through an amplifier U1D to switch "on" and "off" a transistor Q5. The transistor Q5 has its emitter connected to the +5-volt supply voltage, its base connected through a resistor R9 to the output of the amplifier U1D and its collector connected to the respective first terminals of a capacitor C17 and a resistor R22 whose second terminals are respectively grounded and connected to the summing node 6.

When the laser range finder system is inactive, the output of the amplifier U1D is low, and the transistor Q5 is on, causing the capacitor C17 to be charged to +5 volts. When the laser is fired and the range counter chip 25 generates a count enable signal, indicating the system is active, TPT changes state so as to turn off the transistor Q5, causing the capacitor C17 to discharge through the resistor R22. This action results in a voltage being summed into the node 6 of the amplifier U2B which decays to zero over time. In this manner, an initial offset is added to the threshold voltage present on the signal path 172 (FIG. 1). After a few microseconds, this initial offset decays to zero such that only the steady state threshold voltage remains.

Thus, the amplifier U2B comprises the summing junction for the detected signal, the TPT signal, and the $V_{CAL}$ signal. The amplifier U2B is biased by respective grounded capacitors C15, C24 and respective resistors R11, R12 connected to the ±5-volt supply voltages, and has a feedback resistor R25 connected from its output to its inverting input.

The output of the amplifier U2B is low-pass filtered to eliminate noise by a low-pass filter 207 comprising a resistor R26 and a capacitor C9 and supplied to the noninverting input of the threshold comparator 171. The output of the amplifier U2B is also tapped off to a voltage divider and to an operational amplifier U3B.

The voltage divider comprises a resistor R27 and a resistor R26 and provides two resistor-buffered high-bandwidth test points where the actual video signal may be viewed, for example, on an oscilloscope for test purposes. The amplifier U3B is a low-bandwidth buffer operational amplifier which provides the offset voltage signal $V_{OFFSET}$ to the microcontroller 13.

The threshold comparator 171 provides a differential emitter coupled logic (ECL) voltage across first and second output terminals 211, 212. A resistor R45 and a capacitor C33 are connected in a feedback path from the output terminal 211 to the noninverting input of the threshold comparator 171, whose inverting input is grounded. These feedback components C33, R45 provide a hysteresis effect by providing feedback which assists in strengthening weak input signals to the comparator 171 so as to effectively add gain and generate an improved output pulse detection. After a detected pulse has passed, the circuit settles back to steady state.

The ECL output of the threshold comparator 171 is fed to a latch circuit 173 (FIG. 1), which includes a second comparator in order to provide a false alarm FAR signal to the microcontroller 13. The latch circuit 173 will detect an output pulse width from the threshold comparator 171 of a width such as 30 to 50 nanoseconds and latch that output for a time period long enough for it to be read by the microcontroller 13. After the microcontroller 13 reads the output of the latch circuit 173, the latch circuit 173 is reset to wait for the next output pulse from the threshold comparator 171. Such a latch circuit 173 is provided because the TTL logic of the preferred microcontroller 13 can only detect signals approximately one microsecond or longer in duration.

System Operation

The overall operation of the preferred embodiment will now be described in further detail in conjunction with FIG. 8. As shown, the system is first enabled by application of battery power, step 203, by closing the LRF ON/OFF switch 120. In response, the power control unit 51 charges the PFN capacitor $C_{PFN}$, step 205 Of FIG. 8. The receiver 16 and range counter chip 25 are unpowered during this time and remain so until subsequently activated by the microcontroller 13. At completion of step 205, the microcontroller 13 is in a low power "sleep" state and the system is using less than 10 mA of battery current. The microcontroller 13 can only be awakened by activating the FIRE LRF button 28, step 217, or an internal watchdog timer, step 211.

The watchdog timer periodically wakes up the microcontroller 13 if it has been in the sleep state for an extended period of time. To do this, the watchdog timer generates an interrupt, which causes the microcontroller 13 to perform a background diagnostic and calibration routine, step 215, primarily to keep the laser range finder receiver 16 calibrated when the range finder is not being operated.

Figure 8:
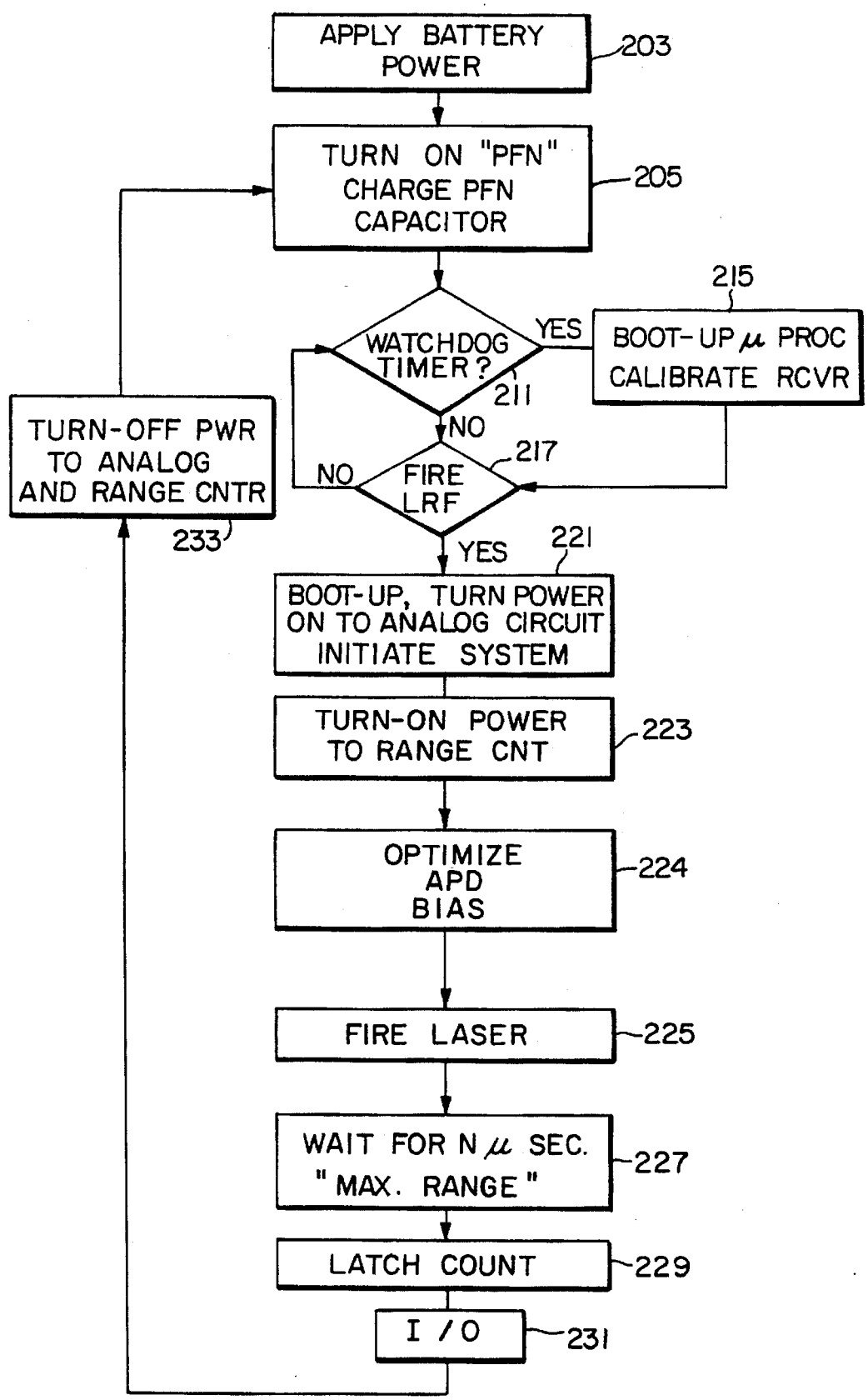
FIGS. 8, 9, and 10 are flow charts useful in illustrating the structure and operation of the preferred embodiment.

The FIRE LRF signal issues an interrupt to the microcontroller 13 and causes the microcontroller 13 to activate a laser ranging sequence, beginning with step 221 of FIG. 8. In step 221, the microcontroller 13 boots up, turns on the receiver circuitry 16 via signal lines 76, 87, and initializes the system. After these operations, power is turned on to the digital range counter chip 25, step 223. An APD detector bias optimization routine is then performed, step 224.

The laser is then fired, step 225. To accomplish firing, the microcontroller 13 activates the F/L Fire signal to the PFN power unit 67, which, in turn, provides the flash lamp trigger signal by dumping the $C_{PFN}$ voltage to the flash lamp of the laser module 115. After the return pulse is detected, the microcontroller 13 delays for an interval equal to the maximum count of the range counter 183, step 227, and then latches the count or counts of the range counter 183, step 229. The count is then output through the system I/O 29 to the associated fire control circuitry 111, step 231. The microcontroller 13 then turns off the power to the receiver 16 and the range counter chip 25, step 233, and returns to recharge the PFN capacitor $C_{PFN}$ for the next firing operation before reentering the "sleep" state.

The range counter 183 which forms part of the range counter chip 25 is typically only needed for 100 microseconds each time a laser pulse is sent. Therefore, the range counter chip 25 is powered separately by the linear regulators 71, 75. The objective is to activate the range counter chip 25 only as necessary. The analog electronics of the receiver 16 needs to be powered for other functions such as detector bias optimization, threshold setting, offset nulling, and test purposes. These considerations require the analog electronics of the receiver 16 to be powered during periods of time when the range counter chip 25 is not needed. The microcontroller 13 is therefore programmed to track the laser range finder sequence and to activate the linear regulators 71, etc. only when their particular associated analog or digital circuitry requires power. Thus, the microcontroller 13 acts as the system state machine, sequencing power on and off to various functions as needed.

Receiver Calibration

As noted above, threshold detection is achieved according to the preferred embodiment by a comparator 171 working against a reference voltage. The ratio of the reference voltage to the noise at the input of the comparator 171 is the required signal-to-noise ratio before a detection is declared by the receiver 16.

Figure 9:
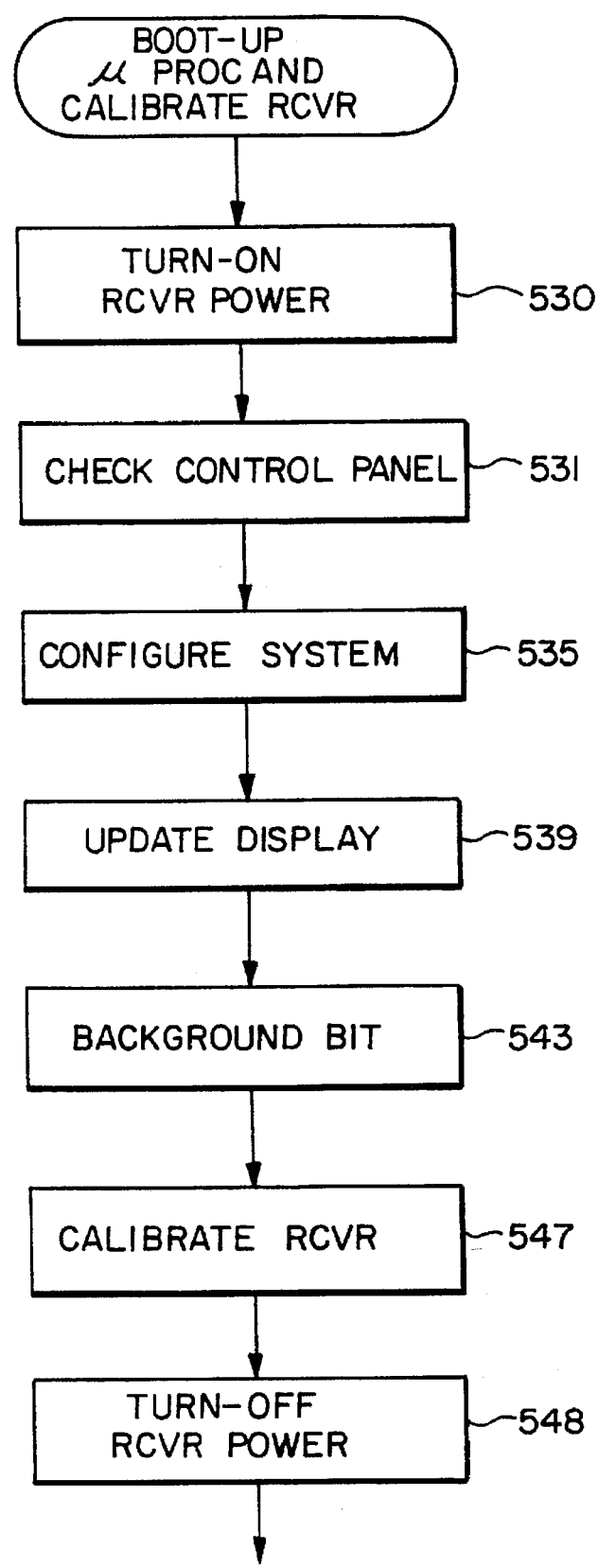

As illustrated in FIG. 9, receiver calibration is performed as the last step 547 of the boot-up and calibration routine 215. Prior to recalibration, the microcontroller 13 checks the control panel status, step 531; assures that the system is properly configured, step 535; updates the display 190, step 539; and performs a background built-in test (BIT), step 543. This last step may perform built-in tests such as turning on the range counter 183 and checking its operation and flashing various displays, for example, to show the software version and configuration number. The microcontroller 13 activates power to the receiver 16 for calibration and BIT purposes, step 530.

The approach to calibrating the receiver 16 employed by the microcontroller 13 centers upon monitoring the false alarm rate. The false alarm rate is typically a specification from the customer, e.g., one false alarm in 100 laser firings. The system is optimized to get maximum sensitivity and to meet the desired false alarm rate.

To calibrate the receiver 16, the microcontroller 13 incrementally adjusts the calibration voltage $V_{CAL}$ with no signal input, i.e., no light on the detector 315, and no TPT voltage, until the offset voltage $V_{OFFSET}$ is zero. With the offset voltage $V_{OFFSET}$ set to zero, numerous false alarms occur. The microcontroller 13 then adjusts $V_{CAL}$, again with no signal input, while monitoring the false alarm rate by reading the latch circuit 173 until the required false alarm number, e.g., one in 10 milliseconds, is achieved. At this point, the offset voltage $V_{OFFSET}$ has moved away from zero and the receiver 16 is considered calibrated.

APD Bias Optimization

The APD photodetector 315 has gain associated with it and goes into avalanche at the limit of detector bias. The optical gain of the detector 315 is equal to the breakdown voltage minus the operating point (bias) voltage divided into the number "55," as a first order approximation. As the bias voltage on the detector 315 is increased, so is internal noise. Thus, the goal of the microcontroller 13 operation is to increase the detector noise until the detector noise is larger than the electronics noise, at which point optimum sensitivity is attained. This operation is implemented by lowering the APD voltage in approximately 0.5-volt increments from a high false alarm rate voltage level.

Figure 10:
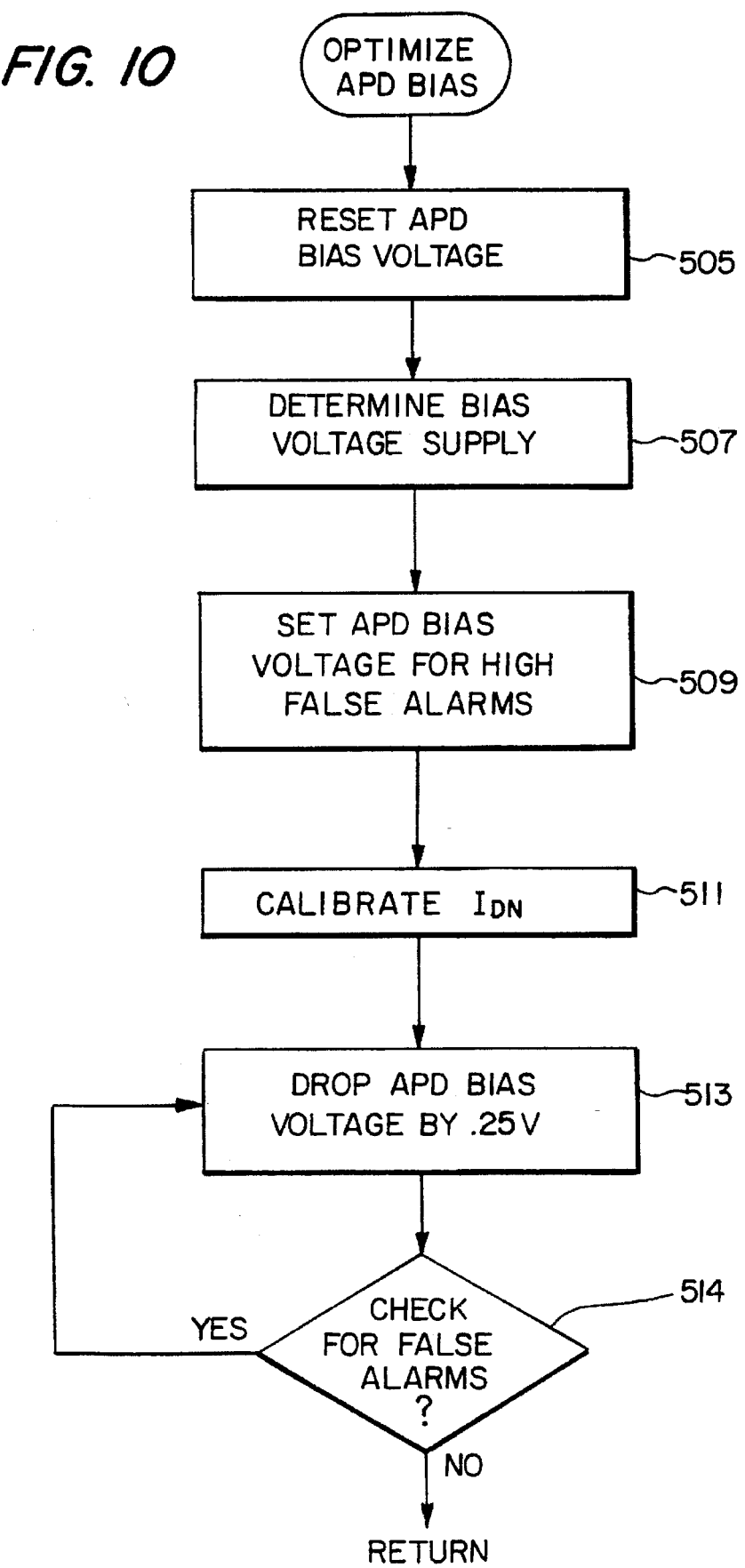

The microcontroller procedure for optimizing or recalibrating the detector bias voltage is illustrated in the flow chart of FIG. 10. This procedure is performed beginning with the value of $V_{CAL}$ determined during the receiver calibration procedure of FIG. 9 and with the value of the voltage at the ungrounded input of the threshold comparator 171 increased, e.g., by 4 millivolts beyond that set during receiver calibration, by increasing $V_{CAL}$. The value of 4 millivolts is empirically determined to set the threshold high with respect to the receiver noise without APD bias.

After a laser fire signal is received, power to the range counter chip 25 is turned on, step 223 (FIG. 8). The APD bias voltage is then set to zero by activating the control signal $I_{DN}$, step 505. The value of the bias voltage from the power supply (e.g. 130 volts) is then determined via the PFN voltage sense lead, step 507, in order to determine the amount of time $I_{UP}$ must be activated in order to cause the APD bias voltage to increase in voltage by a predetermined amount.

Next, the APD voltage is set to a value which causes a high false alarm rate, step 509. In the next step, 511, the time period for which $I_{DN}$ must be "on" to cause a 0.25-volt drop or step-down of the APD bias voltage is determined. The procedure may be understood from the following equations:

$$V_{NEW} = V_1 e^{\frac{-\Delta t}{\rho}}, \tau = (22 \mu F)(200K) = 4.4 \text{ msec}$$

$I_{DN}$ is turned on for $\Delta t$ seconds in order to reduce the APD bias voltage from $V_1$ to $V_{NEW}$.

$$\frac{V_{NEW}}{V_1} = e^{\frac{-\Delta t}{\tau}} \quad (1)$$

Taking the natural log of both sides of Equation (1) yields:

$$\text{Ln} \frac{V_{NEW}}{V_1} = \frac{\Delta t}{\tau} \quad (2)$$

or:

$$\Delta t = \tau \text{Ln} \left( \frac{V_{NEW}}{V_1} \right) \quad (3)$$

After determining $\Delta t$ pursuant to the above procedure, one or more 0.25-volt step-downs of the APD bias voltage are caused by activating the control signal $I_{DN}$ for one or more time periods until the false alarm rate meets the false alarm rate specification stored in the NOVRAM table, step 513 and test 514. When test 514 is satisfied, the microcontroller 13 returns to the flow of FIG. 8.

The microcontroller 13 further is programmed to monitor the temperature signal $V_{TEMP}$ and test it to determine whether the temperature has changed by a selected amount, e.g., 1° C. The microcontroller 13 may then cause recalibration of the receiver and an APD bias adjustment sequence.

The APD bias voltage is preferably optimized every time the laser is fired because the exact operating point and temperature will typically change between firings. In systems requiring high PRF (>1 Hz), receiver calibration and APD bias adjustment cannot be accomplished each time the system is fired. Under these conditions, the system is optimized as needed when the temperature changes by ~1° C. This optimization usually occurs between frames of data or is requested from the system computer. The system computer then allocates a benign time slot in order to reoptimize the receiver 16.

As noted, in the TIA 317 illustrated in FIG. 3, there is a 51K resistor R5 which turns out to set the bandwidth of the TIA 317, which may be, for example, 35 MHz at the 3-dB points. From system to system, depending on the type of laser and the operating requirements, the value of the resistor R5, the gain of the postamp 155, and the bandwidth of the matched filter 157 may be changed to optimize the system based on pulse width of the laser pulse fired by the range finder, important features to be extracted, range resolution, range accuracy, multitarget discrimination, and sensitivity.

To summarize, the architecture described by this invention uses a universal chip set, i.e., the microcontroller chip 13 and the range counter chip 25, which can be reconfigured to support most pulsed laser systems. The system is built around one of these chips—the simple low-cost off-the-shelf microcontroller 13. The microcontroller 13 is a single-chip computer with built-in RAM, ROM, ADC, timers, UART, and DACs. The microcontroller 13 allows for a high degree of integration and increased system performance due to the ability to optimize parameters and perform real time calibrations. Also, the software-driven architecture allows for easy adaptation to specific system platform requirements. Changing software can be as easy as plugging the hardware into a personal computer serial port and downloading new software with the push of a button, a feature not possible with discrete designs of the past. The same microcontroller 13 can be utilized to control the power supply 17, laser control, and displays.

The optical receiver 16 is built around the microcontroller 13. The microcontroller 13 is used to optimize the false alarm rate (FAR) by controlling the threshold voltage at node 6 of the circuit of FIG. 4. The microcontroller 13 also continuously monitors the detector temperature and periodically optimizes or "recalibrates" the detector bias, giving the system optimum sensitivity over the entire temperature range. The receiver 16 contains time program threshold (TPT) that minimizes false returns from near-in atmospheric back-scatter.

The disclosed APD biasing concept uses simple current sources that charge and discharge the APD bias voltage. The discharge rate is slow enough such that insignificant amounts of current flow through the parasitic capacitance across the APD. The TIA amplifier 317 remains within its small signal dynamic range, allowing for very fast settling after the current source is disabled. This simplifies the circuitry by allowing the removal of one of an input clamping diode at the input of the preamplifier 317, effectively increasing the sensitivity of the system.

The gain-versus-bias curve for the InGaAs APDs are steeper than for the silicon APDs commonly used with Nd:YAG range finders and, hence, require a more precise setting to obtain maximum gain with minimum noise. Thus, the single chip computer or microcontroller 13 permits use of such APDs by enabling optimizing operating parameters such as detector bias and system FAR.

The addition of an on-substrate temperature sensor 319 allows the system to operate at peak sensitivity over all operating conditions. The frequency response of the system is measured by illuminating the APD detector 315 with an unmodulated CW source and examining the noise spectrum at the output of the TIA. The noise spectrum will have a power envelope versus frequency that is characteristic of the detector/preamplifier (TIA) frequency response. Additional parasitic capacitance and all of the components required to test frequency response in the prior art are eliminated. Thus, a net effect of the invention is lower cost and significantly higher yield due to increased margin on sensitivity, as well as optimal system performance over operating temperature extremes.

As is further apparent from the above discussion, the receiver 16 has been designed to operate from supply voltages of +5 and −5 V DC. The regulation of the −5 volts is not critical. In fact, a simple charge pump (4 pin dip or SOIC and capacitor) supplying a peak current of approximately 30 mA is all that is required. The +5 volts uses less than 60 mA peak.

In general, according to the invention, the major functional modules of the laser range finder comprising its analog and digital circuitry 16, 25 are powered only when needed, thereby eliminating considerable power consumption. Since the duty cycle of the resulting system is typically much less than 1%, most of the costly conventional DC to DC power converters can be replaced with small, low-cost linear regulators, which also can be switched on as needed.

The disclosed digital architecture is low cost, yet versatile enough to operate in any laser system. The architecture of FIG. 1 is ideally designed to cooperate with a single IC range counter chip 25, which can include a >600 MHz synchronous range counter, 16 bits of dynamic range (65,000 meters maximum range (150 MHz), 16,000 meters maximum range (600 MHz)), an integrated delay line differentiator to improve range accuracy by factor of 10, Identification Friend or Foe ("IFF") circuitry, double buffering for imaging applications, fast bus architecture allowing for >5 MHz data transfer rate (byte wide), and integrated comprehensive built-in test ("BIT").

Another capability which may be provided on the chip 25 is the ability to capture not only the first and last return, but also the last seven returns. For pulsed systems this adds another dimension to be exploited for target discrimination. This is especially important when operating in smoke or dust environments.

Another clutter filter which may be integrated into the architecture is the programmable range gate of FIG. 7. The programmable range gate can be programmed to any range and can have any range depth. The gated range counter 183 accepts returns at specific times, e.g., 1 km to 5 km accepted to fill up, e.g., seven range registers. This allows the user to search for visible target ranges by eliminating clutter returns that are outside the programmed range gate.

Triservice code capability for designator applications may also be implemented. Designator applications require a pseudorandom time interval between laser firings. In such case, a separate counter is used to count down from a preloaded value calculated by the microcontroller 13. When the counter counts down to zero, the microcontroller 13 receives an interrupt signifying the beginning of a firing sequence.

A digital filtering algorithm could be employed, thereby allowing the microcontroller 13 to digitally alter postamplifier gain, matched filter bandwidth, and otherwise perform the receiver functions digitally.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A laser range finder apparatus comprising:
   receiver means including a detector and means for providing a plurality of output signals indicative of the state of said receiver means, said receiver means being responsive to at least one calibration signal to adjust the performance thereof; and
   means for generating a laser pulse, for receiving a return pulse and supplying at least a portion of the return pulse to said detector;
   power supply means for selectively supplying power to said means for generating said laser pulse, to said receiver means, and to said detector in response to a plurality of power control signals; and
   programmed controller means responsive to said output signals for calibrating said receiver means by supplying said at least one calibration signal to said receiver means and for selectively supplying said power control signals to said power supply means.

2. The laser range finder apparatus of claim 1 further including digital circuit means including digital range counter means for generating a count representative of the time interval between firing of said laser pulse and detection of a return pulse by said receiver means, said controller means further controlling said power supply means to selectively supply power to said digital range counter means.

3. The laser apparatus of claim 2 wherein said digital circuit means further includes IFF counter means for generating a count indicative of the interval between a laser fire command and the actual firing of the laser and supplying said count to said controller means.

4. The laser apparatus of claim 2 wherein said digital circuit means further includes programmable range gate means for selecting an interval of time during which said range counter means is enabled to count.

5. The laser apparatus of claim 2 wherein said digital circuit means further includes delay line differentiator means for triggering operation of said range counter means.

6. The laser apparatus of claim 3 wherein said digital circuit means further includes programmable range gate means for selecting an interval of time during which said range counter means is enabled to count.

7. The laser apparatus of claim 6 wherein said digital circuit means further includes delay line differentiator means for triggering operation of said range counter means.

8. The laser range finder apparatus of claim 7 further including display means for displaying parameters related to operation of said laser range finder, said controller means further being operable to control the display provided by said display means.

9. The laser range finder apparatus of claim 1 wherein said controller means is field reprogrammable to vary selected parameters.

10. The laser range finder apparatus of claim 5 wherein said controller means include storage means for storing a plurality of said parameters, said storage means being partitioned into a table means for storing said parameters and a code storage means for storing executable program code.

11. The laser range finder apparatus of claim 1 wherein said output signals include a voltage offset signal and a voltage indicative of detector temperature and wherein said at least one calibration signal includes a calibration voltage.

12. The laser range finder apparatus of claim 11 wherein said receiver means is further responsive to calibration signals comprising up and down current control signals.

13. In a laser range finder apparatus comprising means for generating and outputting a laser pulse, a receiver means for receiving and detecting an optical return pulse and providing a signal indicative of the detection of a said return pulse, a range counter means for counting the interval between an output laser pulse and a return pulse, and power supply means for powering said generating means, receiver means, and range counter means, the improvement comprising:
   means for sequencing the application of power to said receiver means and range counter means and for recalibrating said receiver means during a plurality of selected time intervals.

14. The laser range finder apparatus of claim 13 wherein said receiver means includes an optical detector requiring a bias voltage and wherein said recalibrating includes adjustment of said bias voltage.

15. The laser range finder apparatus of claim 13 wherein said recalibrating includes false alarm rate adjustment.

16. The laser range finder apparatus of claim 14 wherein said bias voltage adjustment is performed after detection of a selected change in temperature of said detector by said means for sequencing and recalibrating.

17. The laser range finder apparatus of claim 13 wherein said means for sequencing and recalibrating includes a programmed controller means.

18. A method of controlling laser range finder apparatus including a receiver comprising the steps of:
   monitoring the state of said receiver under control of a stored program;
   periodically recalibrating said receiver under control of said stored program; and
   sequencing the application of power to said receiver and range counter under control of said stored program.

19. The method of claim 18 wherein said receiver includes an optical detector requiring a bias voltage and wherein said step of recalibrating includes the steps of:

setting said bias voltage at a selected level to cause an initially high false alarm rate; and incrementally decreasing said bias voltage while monitoring said false alarm rate until a desired false alarm rate is achieved.

20. The method of claim 18 wherein said receiver includes an optical detector and wherein said step of recalibrating includes the steps of:

adjusting a calibration signal level with no light on the optical detector until an offset voltage level is equal to zero;

monitoring a false alarm rate; and adjusting said calibration signal level until a selected false alarm rate is achieved.

21. The method of claim 20 wherein said step receiver includes a detector and said step of recalibrating includes the steps of:

monitoring the detector temperature; and recalibrating said receiver in response to detection of a variation of said temperature from a reference temperature by a selected amount.

22. A laser range finder apparatus comprising:

receiver means for detecting a return pulse and providing an output signal indicative thereof;

a single integrated circuit chip connected to receive said signal from said receiver means and having a digital range counter and digital return storage circuitry fabricated therein;

a power supply means for powering said receiver means and integrated circuit chip; and a single-chip programmed processor means for sequencing power to said receiver means and integrated circuit chip, for controlling laser firing, and for recalibrating said receiver means.

23. The laser range finder apparatus of claim 22 further including display means for displaying parameters related to operation of said laser range finder apparatus.

* * * * *